United States Patent [19]

Björlin et al.

[11] Patent Number: 4,670,184
[45] Date of Patent: Jun. 2, 1987

[54] SUSPENSION OF AMMONIUM CARBONATE AND/OR AMMONIUM HYDROGEN CARBONATE OF IMPROVED STABILITY AND ITS USE

[75] Inventors: Anders Björlin, Laxå ; Thomas Edberg; Eva Sjöblom, both of Huddinge; Anders Westling, Upplands Väsby, all of Sweden

[73] Assignee: Swedspan AB, Växjö, Sweden

[21] Appl. No.: 716,251

[22] Filed: Mar. 26, 1985

[51] Int. Cl.$^4$ .................. B01J 13/00; C09K 15/16
[52] U.S. Cl. ................................. 252/311; 524/424; 524/211; 252/356; 252/405
[58] Field of Search ............ 252/310, 313.1, 311, 252/356; 524/424, 211

[56] References Cited

U.S. PATENT DOCUMENTS

| 3,758,464 | 9/1973 | Prindle et al. |
| 3,912,548 | 10/1975 | Falgen |
| 4,044,007 | 8/1977 | Howard |
| 4,162,045 | 7/1979 | Katzer et al. |
| 4,175,975 | 7/1979 | MacWilliams et al. |

FOREIGN PATENT DOCUMENTS

| 529099 | 4/1957 | Belgium |
| 0001237 | 4/1979 | European Pat. Off. |
| 0013372 | 7/1980 | European Pat. Off. |
| 0027583 | 4/1981 | European Pat. Off. |
| 4061249 | 1/1977 | Japan |
| 4114307 | 9/1979 | Japan |
| 6169165 | 5/1980 | Japan |
| 654547 | 2/1979 | U.S.S.R. |
| 821447 | 4/1981 | U.S.S.R. |

OTHER PUBLICATIONS

Ullmans Encyklopadie der technischen Chemie, vol. 19, pp. 1-7 (1980).
Chemical Abstracts 85:335G8z, Preparation and Study of a Polyelectrolyte from Acrylic Acid and Ammonium Carbonate, Artykov et al, VINITI 6488-73, 9 pages, (Russ) (1976).

Primary Examiner—John F. Terapane
Assistant Examiner—Susan Wolffe
Attorney, Agent, or Firm—Fleit, Jacobson, Cohn & Price

[57] ABSTRACT

The invention relates to a suspension of ammonium carbonate and/or ammonium hydrogen carbonate in an aqueous solution saturated with respect to said salts and optionally also containing urea. For the purpose of stabilizing the suspension there is incorporated therein a polyacrylic acid having an average molecular weight ($\overline{M}_w$) in the range of $4 \times 10^5 - 1 \times 10^6$, preferably about $7.5 \times 10^5$. The invention also relates to the use of the suspension for treating carbamide-resin bound, wood-based board material, such as plywood, chipboard and wood fibreboard, for reducing the emission of formaldehyde therefrom.

5 Claims, No Drawings

SUSPENSION OF AMMONIUM CARBONATE AND/OR AMMONIUM HYDROGEN CARBONATE OF IMPROVED STABILITY AND ITS USE

The present invention relates to a suspension of ammonium carbonate and/or ammonium hydrogen carbonate in an aqueous solution which is saturated with respect to said salts and which optionally also incorporates urea, and to the use of this suspension for treating carbamide-resin bound, wood-based board, such as plywood, chipboard and fibreboard.

European patent application Ser. No. 80 106 013.8 (Publication No. 0 027 583) discloses a method of reducing the emission of formaldehyde from chipboard or particleboard, by spraying the board with a solution of at least one thermally decomposable ammonium salt. In this case there is used preferably an aqueous solution of ammonium carbonate and/or ammonium hydrogen carbonate. In accordance with a particularly preferred embodiment, the solution also incorporates urea.

The water added with the solution, however, results in disadvantages from the aspect of conditioning and use, and hence the amount of water should be kept as low as possible. However, a lower limit of the amount of water required is placed by the restricted solubility of ammonium carbonate and ammonium hydrogen carbonate as well as by the fact that suspensions of crystals of these salts in saturated solution are unstable with the result that the crystals settle and grow together to form a hard sediment from which the suspension cannot be reestablished in a simple way, such as by stirring or agitation, for example. In the case of operational stoppages or shut-downs, such a solution would, inter alia, rapidly cause blockages in the pipeline from the suspension preparing vessel to the nozzles through which the suspension is sprayed onto the board. Consequently, an object of the present invention is to provide a suspension of ammonium carbonate and/or ammonium hydrogen carbonate in an aqueous solution saturated with respect to said salts and preferably also incorporating urea, which suspension has an improved stability in relation to known suspensions of this kind, such that the crystals settle relatively slowly, said settling resulting in a sediment from which the suspension can be readily reestablished by taking simple mechanical measures, such as stirring, or which suspension preferably remains homogenous for several days.

In accordance with the invention, it has now been found that the stability of a suspension of the aforementioned kind can be greatly improved by adding to the suspension polyacrylic acid having an average molecular weight ($M_w$) in the range of $4 \times 10^5 - 1 \times 10^6$, preferably about $7.5 \times 10^5$.

Consequently, the invention relates to a suspension of the kind mentioned in the introduction, which is characterized in that it also contains polyacrylic acid having an average molecular weight ($M_w$) in the range of $4 \times 10^5 - 1 \times 10^6$, preferably about $7.5 \times 10^5$.

The amount of polyacrylic acid required to achieve a given acceptable stability depends upon several factors, such as the choice of ammonium salt or salts, the amount of salt used and the dimensions of the storage vessel, but the amount of acid suitable in each particular case can be determined by a series of simple pre-experiments. The presence of urea and the quantity in which it is present also influences the amount of polyacrylic acid required. Laboratory tests indicate, however, that in general the concentration should not be lower than 0.4-0.6% by weight, and preferably 0,8-1.2% by weight calculated on the total weight of salt and urea, when present. No additional positive effect is obtained in general when the concentration exceeds 1.5% by weight calculated on the weight of salt and urea, when present.

The maximum concentration of salt and urea, when present, which can be achieved in a suspension stabilized in accordance with the invention depends upon the nature of the substances, the quantities in which they are used, and the dimensions of the storage vessel.

The resultant suspensions have a surprisingly good stability, and at the same time, a low viscosity, which enables the suspensions to be readily transported through pipelines and to be sprayed through nozzles. If a higher viscosity is desired, there can be used small quantities of a thickener, such as rubber of natural origin, alginate and like agents, which will produce as little residue as possible as the water evaporates. These thickened suspensions are suitably applied to the board with the aid of rollers, while the unthickened suspensions are primarily applied by spraying through nozzles.

The polyacrylic acid used may, for example, be one such acid designated Carbopol$^{200}$910 retailed by the BF Goodrich Company, Cleveland, Ohio, USA, having an average molecular weight ($M_w$) of about 750 000.

When used to reduce the formaldehyde emission from chipboard or particleboard, the suspension preferably incorporates urea in an amount which stands in relation to those residual quantities of formaldehyde which can conseivably be released within the passage of time subsequent to treating the board.

The suspension according to the invention can be prepared by adding polyacrylic acid, ammonium salt and optionally urea and a thickener under agitation or stirring to water having a temperature of preferably at most 60° C. The suspension should be stirred or agitated relatively gently, so as to avoid degradation of the polymer. A mixture of ammonium carbonate and ammonium hydrogen carbonate, or solely ammonium carbonate, can also be obtained by adding ammonium hydrogen carbonate to water and then adding ammonia.

The invention also relates to the use of the suspension according to the invention in the treatment of carbamideresin bound, wood-based board material, such as plywood, chipboard and wood-fibreboard to reduce the emission of formaldehyde therefrom.

The invention will hereinafter be illustrated with reference to a number of working examples.

EXAMPLE 1

5 g of urea were added to 20 ml of distilled water at a temperature of 55° C., while stirring and heating to retain a temperature of 50°-55° C. Heating was discontinued when the urea had dissolved, and 15 g of ground ammonium hydrogen carbonate were added. When gases ceased to form, 0.2 g of polyacrylic acid having a molecular weight ($M_w$) of about 750 000 (Carbopol$^{200}$910 from the BF Goodrich Company, Cleveland, Ohio, USA) was added under continued stirring.

A suspension was obtained which was found to be still stable after 6 weeks storage, wherewith less than 3% clear water phase could be detected.

EXAMPLE 2

Example 1 was repeated, but on a scale 10 times greater than that of Example 1. When storing the resultant suspension, which had a volume of approximately 200 ml, a clear supernatant of about 10% was observed after 24 days, and a clear supernatant of about 20% after 34 days.

EXAMPLE 3

The same conditions as those recited in Example 2 were used, with the exception that 1.6 g of polyacrylic acid were used.

When storing the resultant suspension a clear supernatant of about 2% was observed after 2 days, and a clear supernatant of about 20% was observed after 4 days.

The suspension could be readily re-dispersed.

COMPARISON EXAMPLE

Example 1 was repeated in two separate tests, although instad of using Carbopol$^{200}$910 there was used:

(A) 0,2 g polyacrylic acid having an average molecular weight ($M_w$) of about 1 250 000 (Carbopol$^{200}$941 from The BF Goodrich Company, Cleveland, Ohio, USA) and (B) 0.2 g gelatine, wherewith in case (B) the urea and ammonium hydrogen carbonate were added before the gelatine.

When storing the resultant suspensions, the suspension (A) containing polyacrylic acid showed after 2 days a clear supernatant of about 50%, while the suspension (B) containing gelatine had a clear supernatant of about 40%.

We claim:

1. A suspension comprising at least one salt selected from the group consisting of ammonium carbonate, ammonium hydrogen carbonate and ammonium carbonate and ammonium hydrogen carbonate in an aqueous solution saturated with respect to said salt and optionally also including urea, wherein said suspension further comprises polyacrylic acid having an average molecular weight ($M_w$) in the range of $4 \times 10^5 - 1 \times 10^6$ in a suspension stabilizing amount greater than zero but not exceeding 1.5% by weight of the total weight of salt and urea.

2. The suspension as claimed in claim 1, wherein the polyacrylic acid has an average molecular weight of ($M_w$) of about $7.5 \times 10^5$.

3. The suspension as claimed in claim 1, wherein the polyacrylic acid is present in an amount of at least 0.4–0.6% by weight of the total weight of salt and urea.

4. The suspension as claimed in claim 1, wherein the polyacrylic acid is present in an amount between approximately 0.8–1.2% by weight of the total weight of salt and urea.

5. The suspension as claimed in claim 1, wherein said suspension also contains a thickener.

* * * * *